US012632557B2

(12) United States Patent
Albero et al.

(10) Patent No.: US 12,632,557 B2
(45) Date of Patent: May 19, 2026

(54) SYSTEM AND METHOD FOR IMPROVING SECURITY OF SOFTWARE DEVELOPMENT LIFE CYCLES

(71) Applicant: Bank of America Corporation, Charlotte, NC (US)

(72) Inventors: George Albero, Charlotte, NC (US); Naga Vamsi Krishna Akkapeddi, Charlotte, NC (US); Sanjay Lohar, Charlotte, NC (US); James J. Siekman, Charlotte, NC (US); Elijah Clark, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 120 days.

(21) Appl. No.: 18/583,025

(22) Filed: Feb. 21, 2024

(65) Prior Publication Data

US 2025/0265338 A1     Aug. 21, 2025

(51) Int. Cl.
G06F 21/00         (2013.01)
G06F 8/77          (2018.01)
G06F 21/57         (2013.01)

(52) U.S. Cl.
CPC ............... G06F 21/57 (2013.01); G06F 8/77 (2013.01); *G06F 2221/033* (2013.01)

(58) Field of Classification Search
CPC ....... G06F 21/57; G06F 8/77; G06F 2221/033
See application file for complete search history.

(56) References Cited

U.S. PATENT DOCUMENTS

| | | | |
|---|---|---|---|
| 7,725,891 B2 | 5/2010 | Demuth et al. | |
| 8,091,065 B2 | 1/2012 | Mir et al. | |
| 8,645,843 B2 | 2/2014 | Chee et al. | |
| 9,383,984 B2 | 7/2016 | Mantripragada et al. | |
| 10,411,975 B2 | 9/2019 | Martinez et al. | |
| 10,454,938 B2 | 10/2019 | Anderson et al. | |
| 10,740,469 B2 | 8/2020 | Zheng | |
| 10,848,498 B2 | 11/2020 | Childress et al. | |
| 10,880,189 B2 | 12/2020 | Martinez et al. | |
| 11,379,219 B2 | 7/2022 | Bhalla et al. | |
| 11,853,430 B2 | 12/2023 | Bhalla et al. | |
| 12,141,291 B1 * | 11/2024 | Rappaport | G06F 8/77 |
| 2008/0216056 A1 | 9/2008 | Bate et al. | |
| 2012/0117531 A1 | 5/2012 | Rosenbaum et al. | |

(Continued)

*Primary Examiner* — Ghazal B Shehni

(57) ABSTRACT

A method includes accessing a first set of instructions corresponding to a first instance of a software application and a second set of instructions corresponding to a second instance of the software application; and determining a first interaction context associated with the first instance of the software application and a second interaction context associated with the second instance of the software application. The method further includes accessing a set of security roles assigned during a development phase of the first instance of the software application and the second instance of the software application, executing a machine-learning model trained to identify whether a security roles is assigned to both the first interaction context and the second interaction context, and in response to identifying that the security role is assigned to both the first interaction context and the second interaction context, generating a reassignment recommendation for reassigning the security role.

20 Claims, 3 Drawing Sheets

(56) References Cited

U.S. PATENT DOCUMENTS

Figure 1:
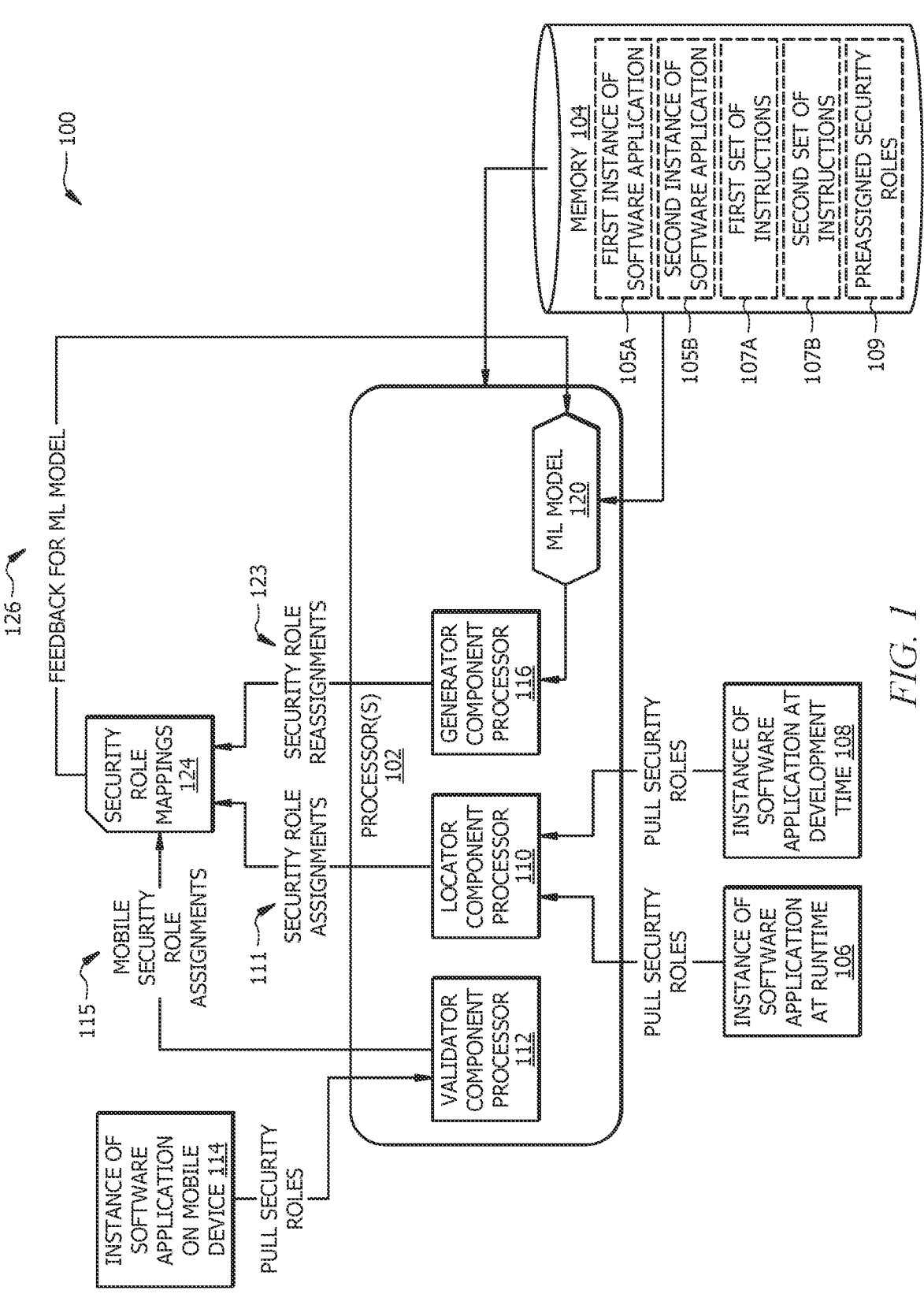

| 2017/0177860 | A1* | 6/2017 | Suarez | G06F 21/53 |
|---|---|---|---|---|
| 2019/0303541 | A1 | 10/2019 | Reddy et al. | |
| 2019/0303579 | A1 | 10/2019 | Reddy et al. | |
| 2019/0303623 | A1 | 10/2019 | Reddy et al. | |
| 2019/0305957 | A1 | 10/2019 | Reddy et al. | |
| 2019/0305959 | A1 | 10/2019 | Reddy et al. | |
| 2019/0306173 | A1 | 10/2019 | Reddy et al. | |
| 2020/0117434 | A1* | 4/2020 | Biskup | G06F 9/445 |
| 2021/0014275 | A1 | 1/2021 | Martinez et al. | |
| 2022/0171857 | A1* | 6/2022 | McHugh | G06F 21/52 |
| 2025/0244965 | A1* | 7/2025 | Bar | G06F 8/35 |

* cited by examiner

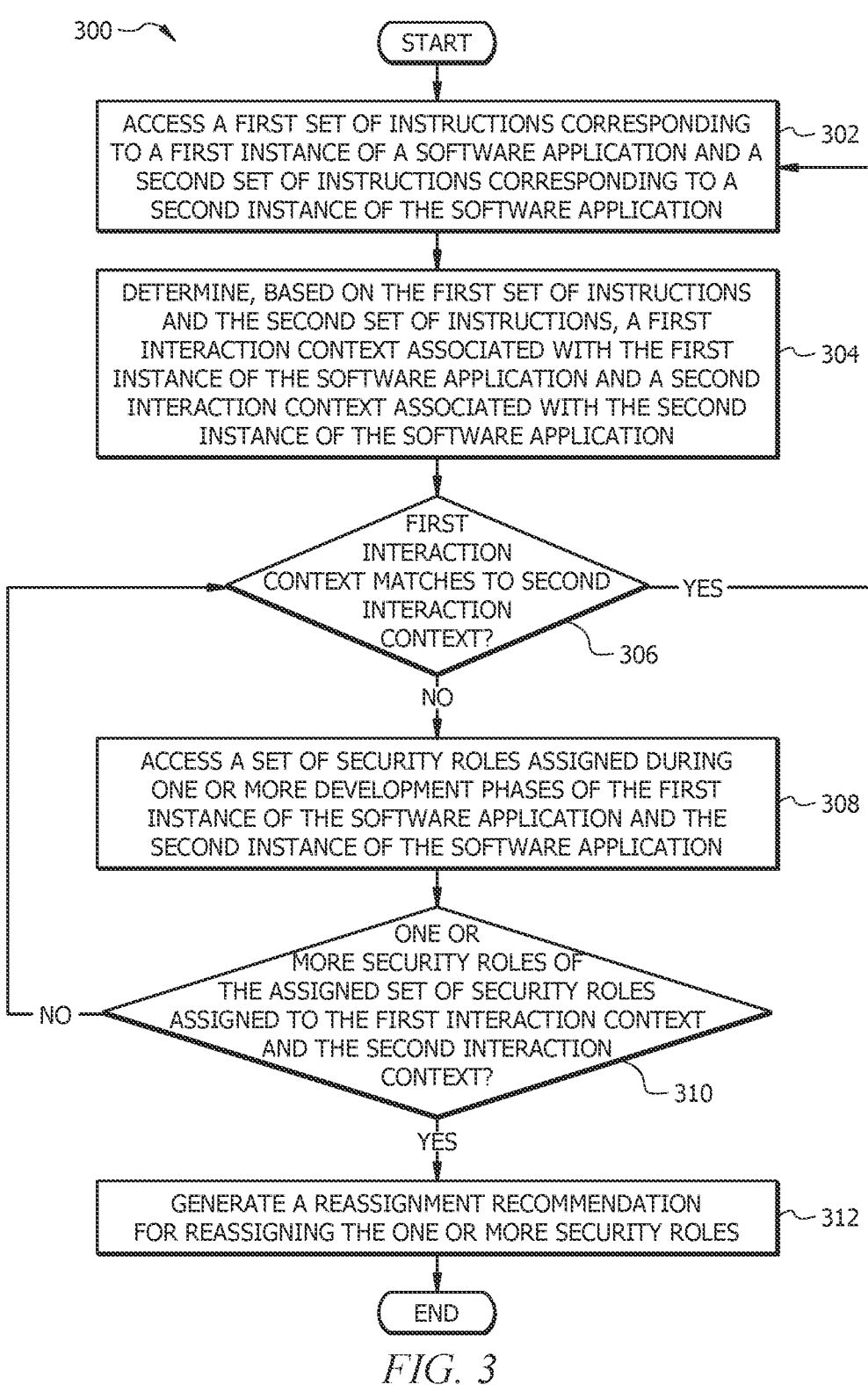

300 ⌒

START

ACCESS A FIRST SET OF INSTRUCTIONS CORRESPONDING TO A FIRST INSTANCE OF A SOFTWARE APPLICATION AND A SECOND SET OF INSTRUCTIONS CORRESPONDING TO A SECOND INSTANCE OF THE SOFTWARE APPLICATION ⌐ 302

DETERMINE, BASED ON THE FIRST SET OF INSTRUCTIONS AND THE SECOND SET OF INSTRUCTIONS, A FIRST INTERACTION CONTEXT ASSOCIATED WITH THE FIRST INSTANCE OF THE SOFTWARE APPLICATION AND A SECOND INTERACTION CONTEXT ASSOCIATED WITH THE SECOND INSTANCE OF THE SOFTWARE APPLICATION ⌐ 304

FIRST INTERACTION CONTEXT MATCHES TO SECOND INTERACTION CONTEXT? — YES ⌐ 306

NO

ACCESS A SET OF SECURITY ROLES ASSIGNED DURING ONE OR MORE DEVELOPMENT PHASES OF THE FIRST INSTANCE OF THE SOFTWARE APPLICATION AND THE SECOND INSTANCE OF THE SOFTWARE APPLICATION ⌐ 308

ONE OR MORE SECURITY ROLES OF THE ASSIGNED SET OF SECURITY ROLES ASSIGNED TO THE FIRST INTERACTION CONTEXT AND THE SECOND INTERACTION CONTEXT? — NO ⌐ 310

YES

GENERATE A REASSIGNMENT RECOMMENDATION FOR REASSIGNING THE ONE OR MORE SECURITY ROLES ⌐ 312

END

FIG. 3

SYSTEM AND METHOD FOR IMPROVING SECURITY OF SOFTWARE DEVELOPMENT LIFE CYCLES

TECHNICAL FIELD

The present disclosure relates generally to software development life cycles, and, more specifically, to a system and method for improving security of software development life cycles.

BACKGROUND

A software development life cycle (SDLC) generally includes a phase-by-phase process or project management and development framework utilized by software development teams to design and build useful software applications and systems. For example, a typical SDLC may include a planning phase, a design phase, a development phase, a testing phase, a deployment phase, and a maintenance phase. The SDLC may also include a general security process. However, such a general security process may lead to the potential for security vulnerabilities in software applications and systems.

SUMMARY

The system and methods implemented by the system as disclosed in the present disclosure provide technical solutions to the technical problems discussed above by providing systems and methods for improving security of software development life cycles. The disclosed system and methods provide several practical applications and technical advantages. Specifically, the present embodiments improve the security, reliability, and maintainability of software applications, systems, and networks, as well as the one or more processors and memory on which the software applications, systems and networks may be executed by identifying and recommending reassignment of security roles throughout a software development life cycle (SDLC) based on the machine-learning model identifying that one or more same security roles are preassigned for different interaction contexts. Thus, the present embodiments may mitigate the potential for cyberattacks, data breaches, or other security vulnerabilities that may be associated with software applications, systems, and networks and the developments thereof.

In accordance with the presently disclosed embodiments, one or more processors of an intelligent role-based security system may execute a machine-learning model trained to identify and recommend reassignment of security roles preassigned during one or more development phases (e.g., planning phase, design phase, development phase, testing phase, deployment phase, maintenance phase, and so forth) of a software application based on the machine-learning model identifying that one or more same security roles are preassigned for different interaction contexts. Therefore, the present embodiments may improve security of software development life cycles (SDLCs). For example, in accordance with the presently disclosed embodiments, the trained machine-learning model may access and analyze one or more sets of usage metrics associated with one or more instances of the software application and the preassigned security roles and identify any different interaction contexts having the same assigned security roles. Once the trained machine-learning model identifies different interaction contexts having the same assigned security roles, the trained machine-learning model may then generate a reassignment recommendation for reassigning one or more security roles throughout all phases of the SDLC. In some embodiments, the intelligent role-based security system and machine-learning model may be implemented as a software application plugin that may be platform agnostic, and thus executable on both cloud-based computing platforms and on-premises computing devices (e.g., mobile computing devices, edge computing devices).

In this way, the present embodiments may improve the security, reliability, and maintainability of software applications, systems, and networks, as well as the one or more processors and memory on which the software applications, systems and networks may be executed by identifying and recommending reassignment of security roles throughout the SDLC. Thus, the present embodiments may mitigate the potential for cyberattacks, data breaches, or other security vulnerabilities that may be associated with software applications, systems, and networks and the developments thereof.

The present embodiments are directed to systems and methods for improving security of software development life cycles. In particular embodiments, one or more processors of a system may access a first set of instructions corresponding to a first instance of a software application and a second set of instructions corresponding to a second instance of the software application. For example, in one embodiment, the first instance of the software application may include an executing instance of the software application and the second instance of the software application may include a second an in-development instance of the software application.

In particular embodiments, the one or more processors may then determine, based on the first set of instructions and the second set of instructions, a first interaction context associated with the first instance of the software application and a second interaction context associated with the second instance of the software application. In particular embodiments, the one or more processors may then access a set of security roles assigned during one or more development phases of the first instance of the software application and the second instance of the software application. In particular embodiments, the one or more processors may then execute a machine-learning model trained to identify whether one or more security roles of the assigned set of security roles is assigned to both the first interaction context associated with the first instance of the software application and the second interaction context associated with the second instance of the software application.

For example, in particular embodiments, the one or more processors may execute the machine-learning model to identify whether the one or more security roles are assigned to both the first interaction context and the second interaction context based on the first set of instructions, the second set of instructions, and one or more usage metrics associated with the first instance of the software application and the second instance of the software application. In particular embodiments, the machine-learning model may be trained based on a set of instructions corresponding to a third instance of the software application, one or more usage metrics associated with the third instance of the software application, and a set of security roles assigned during one or more development phases of the third instance of the software application. In one embodiment, the third instance of the software application may include a preexisting instance of the software application. In particular embodiments, the machine-learning model may include one or more sequence-to-sequence (Seq2Seq) models, one or more encoder-decoder sequence models, or one or more transformer models.

In particular embodiments, in response to identifying that the one or more security roles are assigned to both the first interaction context and the second interaction context, the one or more processors may then generate a reassignment recommendation for reassigning the one or more security roles. For example, in particular embodiments, the one or more processors may generate the reassignment recommendation for reassigning the one or more security roles by assigning a new security role to one of the first interaction context or the second interaction context. In particular embodiments, the one or more processors may assign the new security role to one of the first interaction context or the second interaction context by calling an application programming interface (API) associated with a security domain service.

<center>BRIEF DESCRIPTION OF THE DRAWINGS</center>

For a more complete understanding of this disclosure, reference is now made to the following brief description, taken in connection with the accompanying drawings and detailed description, wherein like reference numerals represent like parts.

Figure 2:
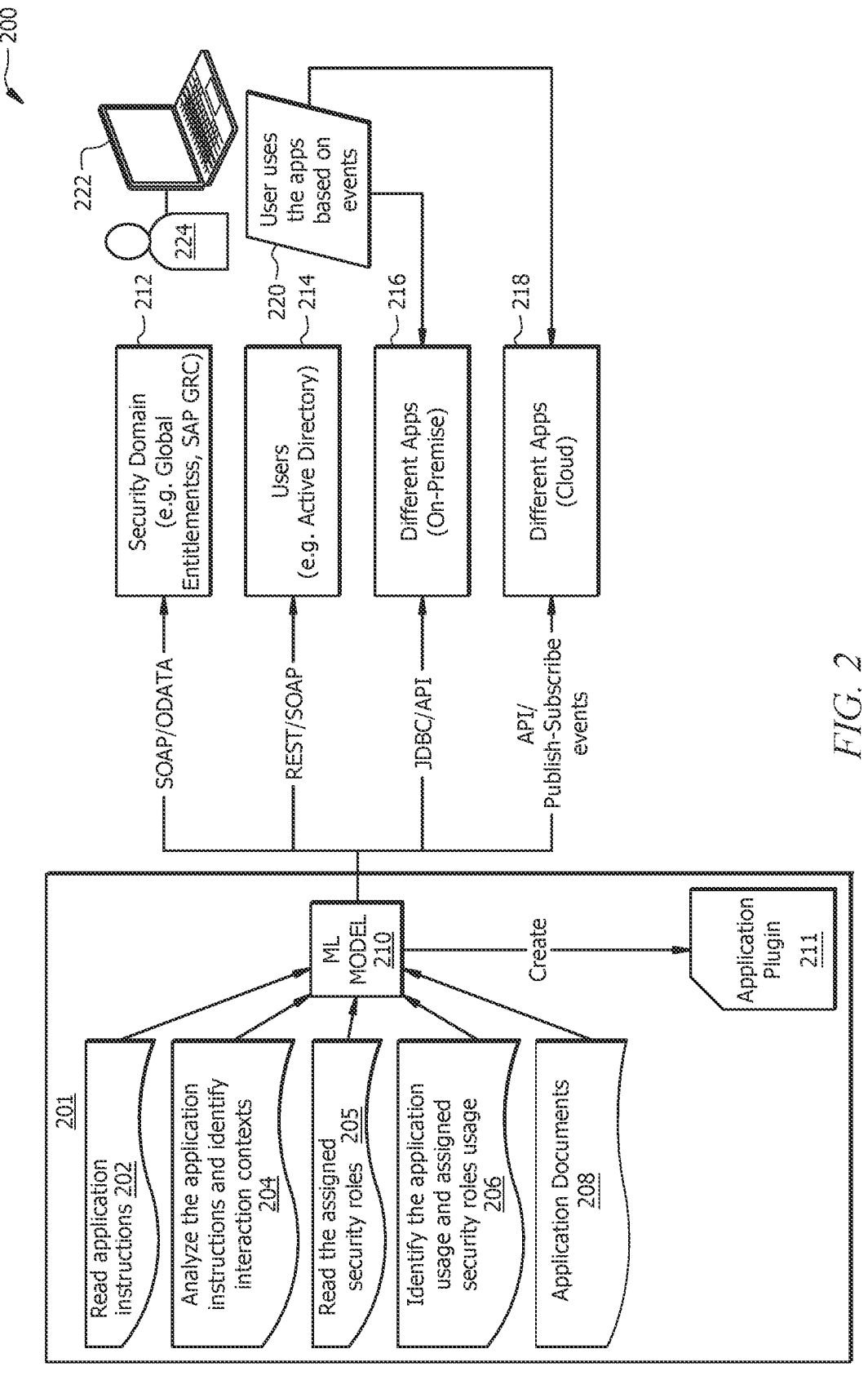

FIG. 1 is a schematic diagram of a system for improving security of software development life cycles, in accordance with certain aspects of the present disclosure;

FIG. 2 illustrates a block diagram of an embodiment of an intelligent role-based security system and environment for improving security of software development life cycles, in accordance with one or more embodiments of the present disclosure; and FIG. 3 illustrates a flowchart of an example method for improving security of software development life cycles, in accordance with one or more embodiments of the present disclosure.

<center>DETAILED DESCRIPTION</center>

Example System

FIG. 1 is a schematic diagram of a system 100 for improving security of software development life cycles, in accordance with certain aspects of the present disclosure. As depicted, the system 100 may include one or more processors 102 and a memory 104, which may be utilized in conjunction to improve security of software development life cycles in accordance with the presently disclosed embodiments. The one or more processors 102 may be operably coupled to the memory 104.

In accordance with the presently disclosed embodiments, one or more processors of an intelligent role-based security system may execute a machine-learning model trained to identify and recommend reassignment of security roles preassigned during one or more development phases (e.g., planning phase, design phase, development phase, testing phase, deployment phase, maintenance phase, and so forth) of a software application based on the machine-learning model identifying that one or more same security roles are preassigned for different interaction contexts. Therefore, the present embodiments may improve security of software development life cycles (SDLCs).

For example, in accordance with the presently disclosed embodiments, the trained machine-learning model may access and analyze one or more sets of usage metrics associated with one or more instances of the software application and the preassigned security roles and identify any different interaction contexts having the same assigned security roles. Once the trained machine-learning model identifies different interaction contexts having the same assigned security roles, the trained machine-learning model may then generate a reassignment recommendation for reassigning one or more security roles throughout all phases of the SDLC. In some embodiments, the intelligent role-based security system and machine-learning model may be implemented as a software application plugin that may be platform agnostic, and thus executable on both cloud-based computing platforms and on-premises computing devices (e.g., mobile computing devices, edge computing devices).

For example, the one or more processors 102 may include any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). In some embodiments, the one or more processors 102 may be a programmable logic device, a microcontroller, a microprocessor, or any suitable combination of the preceding.

The one or more processors 102 may be further communicatively coupled to and in signal communication with the memory 104. The one or more processors may be configured to process data and may be implemented in hardware or software. For example, the one or more processors 102 may be 8-bit, 16-bit, 32-bit, 64-bit or of any other suitable architecture. The one or more processors 102 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors 102 may be further configured to implement various instructions, such as a first set of instructions 107A and a second set of instructions 107B. For example, the one or more processors 102 may be configured to execute instructions (e.g., the first set of instructions 107A and the second set of instructions 107B) stored by the memory 104. In such instances, the one or more processors 102 may be a special-purpose computer designed to implement and execute the functions disclosed herein.

The memory 104 may include one or more disks, tape drives, or solid-state drives, and may be used as an over-flow data storage device, to store programs when such programs are selected for execution, and to store instructions and data that are read during program execution. The memory 104 may be volatile or non-volatile and may include a read-only memory (ROM), random-access memory (RAM), ternary content-addressable memory (TCAM), dynamic random-access memory (DRAM), static random-access memory (SRAM), and so forth. In one embodiment, the memory 104 may include a non-transitory computer-readable medium. As further depicted by the system 100 of FIG. 1, in particular embodiments, the memory 104 may be operable to store the first instance of the software application 105A and the second instance of the software application 105B. For example, in particular embodiments, the first instance of the software application 105A may include an executing instance of an existing runtime software application 106 and the second instance of the software application 105B may include an in-development instance of a development time software application 108.

As further depicted by the system 100 of FIG. 1, the one or more processors 102 may include a locator component processor 110, a validator component processor 112, and a generator component processor 116. Although these processors 110, 112, and 116 are illustrated as separate components, they may be implemented in any suitable number and combination of processors to suitable particular tasks of the system 100. The locator component processor 110 may access the runtime software application 106 and access the development time software application 108 and pull preassigned security roles (e.g., preassigned set of security roles 109) from the runtime software application 106 and the development time software application 108.

The locator component processor 110 may then provide the assigned security roles 111 preassigned in the runtime software application 106 and the development time software application 108 to a set of security role mappings 124. For example, the assigned security roles 111 may include all security roles defined and preassigned to one or more users or one or more developers or designers associated with the runtime software application 106 and the development time software application 108.

Specifically, in one embodiment, certain duties, privileges, permissions, and so forth may be granted to specific security roles as opposed to any individual users or SDLC associated personnel (e.g., developers, designers, software engineers, technology officers, project managers, and so forth). Thus, the assigned security roles 111 may include the pre-assignment of security roles to the individual users or SDLC associated personnel (e.g., developers, designers, software engineers, technology officers, project managers, and so forth) that may be associated with the runtime software application 106 and the development time software application 108.

As further depicted by the system 100 of FIG. 1, the validator component processor 112 may access a mobile device instance of the software application 114. For example, in one embodiment, the mobile device instance of the software application 114 may include a mobile application instance of the software application suitable for executing on a mobile electronic device, and thus the validator component processor 112 may be utilized to pull security roles of any individual users or SDLC associated personnel (e.g., developers, designers, software engineers, technology officers, project managers, and so forth) that may be associated with the mobile device instance of the software application 114. The validator component processor 112 may then provide the mobile device security roles 115 pulled from the mobile device instance of the software application 114 to the set of security role mappings 124.

In particular embodiments, because the assigned security roles 111 and the mobile device security roles 115 may be preassigned, the assigned security roles 111 and the mobile device security roles 115 may not allow for security roles to be analyzed and updated in response to, for example, changes in interaction contexts of one or more of the runtime software application 106, the development time software application 108, and the mobile device instance of the software application 114. In one embodiment, an "interaction context" or "interaction state" may refer to instances in which a software application may be rendered, displayed, configured, instantiated, functioned, or otherwise interacted with differently across different contexts, such as one or more different countries, jurisdictions, states, regulatory environments, security requirements, currencies, markets, and so forth.

In such an example, a transmitting user and a receiving user may interact with the same content as part of a single interaction between the transmitting user and the receiving user, but in different interaction contexts. Thus, having the same preassigned security roles 111, 115 assigned to both interaction contexts may lead to undesirable security vulnerabilities, such as a discrepancy or a failure of the single interaction between the transmitting user and the receiving user. In another embodiment, an "interaction context" or "interaction state" may refer to instances of a software application in different development phases of the SDLC. As noted, if the preassigned security roles 111, 115 were to remain the same across different interaction contexts, the likelihood that the software application would become susceptible to potential security vulnerabilities may be markedly increased.

Thus, in accordance with the presently disclosed embodiments, and as further depicted by FIG. 1, the one or more processors 102 may execute a machine-learning model 120 that may be utilized to identify and recommend security role reassignments 123 and/or a creation of new security roles during one or more development phases (e.g., planning phase, design phase, development phase, testing phase, deployment phase, maintenance phase, and so forth) of the software application based on the machine-learning model 120 identifying that one or more same security roles 111, 115 are assigned for different interaction contexts.

For example, the machine-learning model 120 may include one or more sequence-to-sequence (Seq2Seq) models, one or more encoder-decoder sequence models, one or more transformer models, or one or more threat modeling platforms that may be trained to identify and recommend security role reassignments 123 and/or a creation of new security roles based on one or more sets of usage metrics associated with the runtime software application 106, the development time software application 108, the mobile device instance of the software application 114, the assigned security roles 111, and the mobile device security roles 115.

For example, as will be further appreciated with respect to FIG. 2 below, the machine-learning model 120 may access the first set of instructions 107A (e.g., code corresponding to the runtime software application 106), the second set of instructions 107B (e.g., code corresponding to the development time software application 108), and the preassigned set of security roles 109 and identify the manner in which the runtime software application 106, the development time software application 108, the mobile device instance of the software application 114, the assigned security roles 111, and the mobile device security roles 115 are being used or intended to be used.

As further depicted by the system 100 of FIG. 1, the generator component processor 116 may then provide the security role reassignments 123 and/or a creation of new security roles to the set of security role mappings 124. Specifically, based on the usage of the runtime software application 106, the development time software application 108, the mobile device instance of the software application 114, the assigned security roles 111, and the mobile device security roles 115, the set of security role mappings 124 may be updated in real-time or near real-time to reflect the security role reassignments 123 and/or a creation of new security roles to ensure a secure software development process across all development phases of the SDLC. Lastly, as further depicted by the system 100 of FIG. 1, a feedback loop 126 may be provided to the machine-learning model 120 to iteratively train and retrained the machine-learning model 120 to improve its prediction and decision-making performance.

In a particular embodiment, the machine-learning model 120 may identify and recommend reassignment of security roles preassigned during one or more development phases (e.g., planning phase, design phase, development phase, testing phase, deployment phase, maintenance phase, and so forth) of a software application when the machine-learning model 120 identifies that one or more same security roles are preassigned for different interaction contexts. In one example, in instances in which a payment transaction moves through the invoice-to-payment process, having the same security roles assigned for different states of the invoice-to-payment process may lead to discrepancies in, for example, tax codes, tax rates, payment amounts, currencies, and so forth, particularly when the invoice-to-payment process involves different interaction contexts (e.g., different countries, jurisdictions, states, regulatory environments, security requirements, currencies, markets, and so forth). The machine-learning model identifies such potential security vulnerabilities and recommends reassignments of security roles throughout the SDLC.

Improving Security of Software Development Life Cycles

Embodiments of the present disclosure discuss techniques for improving security of software development life cycles.

FIG. 2 is a block diagram of an embodiment of an intelligent role-based security system and environment 200 for improving security of software development life cycles, in accordance with certain aspects of the present disclosure. As depicted, the intelligent role-based security system and environment 200 may include an intelligent role-based security system 201, a security domain system 212, a user directory database 214, on-premises software applications 216 (e.g., mobile software applications or other edge software applications), cloud-based software applications 218, and computing devices 222 that may be associated with one or more users 224 across different interaction contexts.

In particular embodiments, the intelligent role-based security system 201 may include a machine-learning model 210 and an application plugin 211. In particular embodiments, the machine-learning model 210 may be identical to the machine-learning model 120 as described above with respect to FIG. 1. In particular embodiments, the machine-learning model 210 may access and read software application instructions 202 (e.g., code corresponding to one or more of the on-premises software applications 216 and/or the cloud-based software applications 218) and identify any interaction contexts 204 based on an analysis of the application instructions 202. As generally discussed above with respect to FIG. 1, the on-premises software applications 216 and/or the cloud-based software applications 218 may be at any development phase (e.g., planning phase, design phase, development phase, testing phase, deployment phase, maintenance phase, and so forth) of an SDLC.

In particular embodiments, the machine-learning model 210 may further access and read the assigned security roles 205 for one or more of the on-premises software applications 216 and/or the cloud-based software applications 218. In particular embodiments, the machine-learning model 210 may then identify one or more usage metrics 206 associated with the assigned security roles 205 and the on-premises software applications 216 and/or cloud-based software applications 218. In particular embodiments, the machine-learning model 210 may access and read any available application documentation 208 (e.g., software requirements specifications (SRSs), software development kits (SDKs), test scripts, service-level agreements (SLAs), tables and fields, reports, and so forth) that may be associated with the on-premises software applications 216 and/or cloud-based software applications 218.

In particular embodiments, the one or more usage metrics 206 associated with the assigned security roles 205 and the on-premises software applications 216 and/or cloud-based software applications 218 may also include an indication of events 220 the one or more users 224 may interact with the on-premises software applications 216 and/or cloud-based software applications 218 in response thereto. In particular embodiments, based on the identified one or more usage metrics 206 associated with the assigned security roles 205 and the on-premises software applications 216 and/or cloud-based software applications 218, the identified interaction contexts 204, and the application documentation 208, the machine-learning model 210 may then generate one or more reassignment recommendations for reassigning one or more security roles.

For example, the machine-learning model 120 may publish the reassignment recommendations for reassigning one or more security roles to the security domain system 212, the user directory database 214, the on-premises software applications 216, and the cloud-based software applications 218. In particular embodiments, the machine-learning model 120 may publish the reassignment recommendations for reassigning one or more security roles to the security domain system 212, the user directory database 214, the on-premises software applications 216, and the cloud-based software applications 218 utilizing a simple object access protocol (SOAP), an open data protocol (ODATA), an application programming interface (API), a representational state transfer (REST) protocol, Java database connectivity (JBDC) API, or other similar web service or API that may be called to facilitate the reassignment of security roles or the creation of new security roles.

As further depicted by FIG. 2, the intelligent role-based security system 201 (including machine-learning model 210) may be implemented as a software application plugin 211 that may be platform agnostic, and thus executable on both cloud-based computing platforms and on-premises computing devices (e.g., mobile computing devices, edge computing devices). Specifically, in particular embodiments, upon a first few iterations of the machine-learning model 210 generating a reassignment recommendation for reassigning one or more security roles, the software application plugin 211 may be instantiated based on the learning of the machine-learning model 210. In particular embodiments, the software application plugin 211 may be then associated with one or more of the security domain system 212, the user directory database 214, the on-premises software applications 216, and the cloud-based software applications 218 for executing in accordance with the presently disclosed embodiments.

FIG. 3 illustrates a flowchart of an example method 300 for improving security of software development life cycles, in accordance with one or more embodiments of the present disclosure. The method 300 may be performed utilizing the one or more processors 102 (e.g., locator component processor 110, validator component processor 112, and generator component processor 116) as described above with respect to FIG. 1.

The method 300 may begin at block 302 with the one or more processors 102 accessing a first set of instructions corresponding to a first instance of a software application and a second set of instructions corresponding to a second instance of the software application. For example, in particular embodiments, the first instance of the software application may include an executing instance of a software application (e.g., instance of runtime software application 106) and the second instance of the software application may include an in-development instance of the software application (e.g., instance of development time software application 108).

The method 300 may then continue at block 304 with the one or more processors 102 determining, based on the first set of instructions and the second set of instructions, a first interaction context associated with the first instance of the software application and a second interaction context associated with the second instance of the software application. For example, in particular embodiments, the one or more processors 102 may access the first set of instructions 107A and the second set of instructions 107B from the memory 104 and determine a first interaction context associated with the first instance of the software application (e.g., instance of runtime software application 106) and a second interaction context associated with the second instance of the software application (e.g., instance of development time software application 108).

The method 300 may then continue at decision 306 with the one or more processors 102 determining whether the first interaction context associated with the first instance of the software application matches to the second interaction context associated with the second instance of the software application. In particular embodiments, in response to the one or more processors 102 determining that the first interaction context matches to the second interaction context (e.g., at decision 306), the method 300 may return to block 302. In particular embodiments, in response to the one or more processors 102 determining that the first interaction context does not match to the second interaction context (e.g., at decision 306), the method 300 continue at block 308 with the one or more processors 102 accessing a set of security roles (e.g., the preassigned set of security roles 109) assigned during one or more development phases of the first instance of the software application and the second instance of the software application.

The method 300 may then continue at decision 310 with the one or more processors 102 determining whether one or more security roles of the assigned set of security roles (e.g., the preassigned set of security roles 109) are assigned to both the first interaction context and the second interaction context. For example, in particular embodiments, the one or more processors 102 may execute a machine-learning model 210 trained to identify whether one or more security roles of the preassigned set of security roles 109 is assigned to both a first interaction context associated with the first instance of the software application (e.g., instance of runtime software application 106) and a second interaction context associated with the second instance of the software application (e.g., instance of development time software application 108). In particular embodiments, in response to the one or more processors 102 determining that one or more security roles of the assigned set of security roles (e.g., the preassigned set of security roles 109) are not assigned to both the first interaction context and the second interaction context (e.g., at decision 310), the method 300 may return to decision 306.

In particular embodiments, in response to the one or more processors 102 determining that one or more security roles of the assigned set of security roles (e.g., the preassigned set of security roles 109) are assigned to both the first interaction context and the second interaction context (e.g., at decision 310), the method 300 continue at block 312 with the one or more processors 102 generating a reassignment recommendation for reassigning the one or more security roles. For example, the one or more processors 102 may utilize the machine-learning model 210 to generate one or more recommendations (e.g., the security roles mappings 124) for reassigning the one or more security roles, such that different security roles may be assigned for each of the first interaction context associated with the first instance of the software application (e.g., instance of runtime software application 106) and the second interaction context associated with the second instance of the software application (e.g., instance of development time software application 108).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:

a memory configured to store a first set of instructions corresponding to a first instance of a software application, a second set of instructions corresponding to a second instance of the software application, a third set of instructions corresponding to a third instance of the software application, and a set of security roles assigned during one or more development phases of the first instance of the software application and the second instance of the software application; and one or more processors operably coupled to the memory and configured to:

access the first set of instructions corresponding to the first instance of the software application and the second set of instructions corresponding to the second instance of the software application;

determine, based on the first set of instructions and the second set of instructions, a first interaction context associated with the first instance of the software application and a second interaction context associated with the second instance of the software application;

access the set of security roles assigned during one or more development phases of the first instance of the software application and the second instance of the software application;

train a machine-learning model based on the third set of instructions corresponding to the third instance of the software application, one or more usage metrics associated with the third instance of the software application, and a set of security roles assigned during one or more development phases of the third instance of the software application;

execute the trained machine-learning model to identify whether one or more security roles of the assigned set of security roles is assigned to both the first interaction context associated with the first instance of the software application and the second interaction context associated with the second instance of the software application; and in response to identifying that the one or more security roles are assigned to both the first interaction context and the second interaction context, generate a reassignment recommendation for reassigning the one or more security roles.

2. The system of claim 1, wherein the one or more processors are further configured to generate the reassignment recommendation for reassigning the one or more security roles by assigning a new security role to one of the first interaction context or the second interaction context.

3. The system of claim 2, wherein the one or more processors are further configured to assign the new security role to one of the first interaction context or the second interaction context by calling an application programming interface (API) associated with a security domain service.

4. The system of claim 1, wherein the first instance of the software application comprises an executing instance of the software application, and wherein the second instance of the software application comprises an in-development instance of the software application.

5. The system of claim 1, wherein the one or more processors are further configured to execute the machine-learning model to identify whether the one or more security roles are assigned to both the first interaction context and the second interaction context based on the first set of instructions, the second set of instructions, and one or more usage metrics associated with the first instance of the software application and the second instance of the software application.

6. The system of claim 1, wherein the machine-learning model comprises one or more sequence-to-sequence (Seq2Seq) models, one or more encoder-decoder sequence models, or one or more transformer models.

7. The system of claim 1, wherein the first interaction context or the second interaction context comprises one or more of a national interaction context, a jurisdictional interaction context, a provincial interaction context, a regulatory interaction context, a security requirements interaction context, a currency exchange interaction context, or a market interaction context.

8. A method, comprising:

accessing a first set of instructions corresponding to a first instance of a software application and a second set of instructions corresponding to a second instance of the software application;

determining, based on the first set of instructions and the second set of instructions, a first interaction context associated with the first instance of the software application and a second interaction context associated with the second instance of the software application;

accessing a set of security roles assigned during one or more development phases of the first instance of the software application and the second instance of the software application;

training a machine-learning model based on a third set of instructions corresponding to a third instance of the software application, one or more usage metrics associated with the third instance of the software application, and a set of security roles assigned during one or more development phases of the third instance of the software application;

executing the trained machine-learning model to identify whether one or more security roles of the assigned set of security roles is assigned to both the first interaction context associated with the first instance of the software application and the second interaction context associated with the second instance of the software application; and in response to identifying that the one or more security roles are assigned to both the first interaction context and the second interaction context, generating a reassignment recommendation for reassigning the one or more security roles.

9. The method of claim 8, wherein generating the reassignment recommendation for reassigning the one or more security roles further comprises assigning a new security role to one of the first interaction context or the second interaction context.

10. The method of claim 9, wherein assigning the new security role to one of the first interaction context or the second interaction context further comprises calling an application programming interface (API) associated with a security domain service.

11. The method of claim 8, wherein the first instance of the software application comprises an executing instance of the software application, and wherein the second instance of the software application comprises an in-development instance of the software application.

12. The method of claim 8, wherein executing the machine-learning model further comprises identifying whether the one or more security roles are assigned to both the first interaction context and the second interaction context based on the first set of instructions, the second set of instructions, and one or more usage metrics associated with the first instance of the software application and the second instance of the software application.

13. The method of claim 8, wherein the machine-learning model comprises one or more sequence-to-sequence (Seq2Seq) models, one or more encoder-decoder sequence models, or one or more transformer models.

14. The method of claim 8, wherein the first interaction context or the second interaction context comprises one or more of a national interaction context, a jurisdictional interaction context, a provincial interaction context, a regulatory interaction context, a security requirements interaction context, a currency exchange interaction context, or a market interaction context.

15. A non-transitory computer-readable medium storing instructions that, when executed by one or more processors of a system, cause the one or more processors to:

access a first set of instructions corresponding to a first instance of a software application and a second set of instructions corresponding to a second instance of the software application;

determine, based on the first set of instructions and the second set of instructions, a first interaction context associated with the first instance of the software application and a second interaction context associated with the second instance of the software application;

access a set of security roles assigned during one or more development phases of the first instance of the software application and the second instance of the software application;

train a machine-learning model based on a third set of instructions corresponding to a third instance of the software application, one or more usage metrics associated with the third instance of the software application, and a set of security roles assigned during one or more development phases of the third instance of the software application;

execute the trained machine-learning model trained to identify whether one or more security roles of the assigned set of security roles is assigned to both the first interaction context associated with the first instance of the software application and the second interaction context associated with the second instance of the software application; and in response to identifying that the one or more security roles are assigned to both the first interaction context and the second interaction context, generate a reassignment recommendation for reassigning the one or more security roles.

16. The non-transitory computer-readable medium of claim 15, wherein the instructions further cause the one or more processors to generate the reassignment recommendation for reassigning the one or more security roles by assigning a new security role to one of the first interaction context or the second interaction context.

17. The non-transitory computer-readable medium of claim 16, wherein the instructions further cause the one or more processors to assign the new security role to one of the first interaction context or the second interaction context by calling an application programming interface (API) associated with a security domain service.

18. The non-transitory computer-readable medium of claim 15, wherein the first instance of the software application comprises an executing instance of the software application, and wherein the second instance of the software application comprises an in-development instance of the software application.

19. The non-transitory computer-readable medium of claim 15, wherein the instructions further cause the one or more processors to execute the machine-learning model to identify whether the one or more security roles are assigned to both the first interaction context and the second interaction context based on the first set of instructions, the second set of instructions, and one or more usage metrics associated with the first instance of the software application and the second instance of the software application.

20. The non-transitory computer-readable medium of claim 15, wherein the first interaction context or the second interaction context comprises one or more of a national interaction context, a jurisdictional interaction context, a provincial interaction context, a regulatory interaction context, a security requirements interaction context, a currency exchange interaction context, or a market interaction context.

* * * * *